United States Patent [19]

Yoshimura

[11] Patent Number: 4,701,799
[45] Date of Patent: Oct. 20, 1987

[54] IMAGE DISPLAY PANEL DRIVE

[75] Inventor: Masahiro Yoshimura, Nara, Japan

[73] Assignee: Sharp Kabushiki Kaisha, Osaka, Japan

[21] Appl. No.: 711,076

[22] Filed: Mar. 12, 1985

[30] Foreign Application Priority Data

Mar. 13, 1984 [JP] Japan .................................. 59-48665
Jul. 20, 1984 [JP] Japan ................................ 59-151696

[51] Int. Cl.$^4$ .............................................. H04N 3/14
[52] U.S. Cl. .................................... 358/241; 358/230; 358/152; 340/784
[58] Field of Search ............... 358/152, 230, 236, 241; 340/752, 784, 802

[56] References Cited

U.S. PATENT DOCUMENTS

| | | | |
|---|---|---|---|
| 3,499,982 | 3/1970 | O'Neal, Jr. ...................... | 358/160 X |
| 4,012,772 | 3/1977 | Chambers et al. ................. | 358/11 |
| 4,047,204 | 9/1977 | Gold ................................... | 358/93 |
| 4,210,934 | 7/1980 | Kutaragi ........................... | 358/241 |
| 4,275,422 | 6/1981 | Le Couteur ......................... | 358/214 |
| 4,317,115 | 2/1982 | Kawakami et al. ................. | 340/784 |
| 4,481,511 | 11/1984 | Hanmura et al. ................... | 340/784 |
| 4,496,977 | 1/1985 | Ikeda .................................. | 358/241 |
| 4,574,315 | 3/1986 | Yoshimura ......................... | 358/241 |
| 4,591,849 | 5/1986 | Hughes et al. ..................... | 340/765 |
| 4,602,292 | 7/1986 | Togashi et al. .................... | 358/241 |
| 4,622,590 | 11/1986 | Togachi ............................ | 358/241 |

Primary Examiner—Michael A. Masinick
Assistant Examiner—E. Anne Toth
Attorney, Agent, or Firm—Birch, Stewart, Kolasch & Birch

[57] ABSTRACT

A selection circuit is connected between a display composed of unit picture elements arranged in a dot matrix and a vertical scanning circuit, the selection circuit effects the selection of odd or even lines in the display. The advantages offered by such an arrangement are elimination of the necessity of interlaced scanning in the scanning circuit itself, cutting the number of steps in half in the scanning circuit during interlaced scanning, increase in the margin in operating speed and elimination of limitations on circuit configuration, device construction and materials used.

12 Claims, 7 Drawing Figures

IMAGE DISPLAY PANEL DRIVE

BACKGROUND OF THE INVENTION

This invention concerns a drive circuit for an image display device with unit picture elements arranged in a dot matrix display.

Presently, demand for a flat display device to replace the CRT (Cathode Ray Tube) of a dot matrix image display device has been increasing. Considerable efforts have been made to increase the number of image elements in order to improve resolution, and compact devices which have an image of similar quality to the present television receiver will most likely be put on the market in the near future. Therefore, interlaced scanning must be effected when displaying the present television video signal (such as NTSC composite video signal) on image display devices with an equivalent number of image elements as television. When interlaced scanning is effected, the vertical scanning circuit operating speed is changed in the conventional method, making it difficult to advance two lines on the screen during the horizontal retrace line. In other words, in an image display device that is shown in FIG. 1 with unit picture elements 1, 1 . . . to form a display portion and a horizontal scanning circuit (3) and vertical scanning circuit (4), with an odd field, the odd lines only counted from the top had to be scanned, and with an even field, the even lines only had to be scanned. Therefore, it was necessary to go from $2i-1 \rightarrow 2i+1$ with odd numbers and from $2i \rightarrow 2i+2$ ($i=1, 2, \ldots$) with even numbers, skipping one line at a time with the vertical scanning circuit. This made it necessary to generate a drive pulse during one horizontal retrace line at twice the speed of when interlaced scanning was not effected in the drive circuit for the vertical scanning circuit which created speed limitations. Furthermore, the speed in the above drive circuit and scanning circuit must correspond to the above speed, which in turn created substantial limitations on circuit configuration, device construction and the materials used.

OBJECT AND SUMMARY OF THE INVENTION

The object of this invention is to eliminate the necessity of interlaced scanning in the scanning circuit itself, cut the number of steps in half in the scanning circuit during interlaced scanning, increase the margin in operating speed and eliminate limitations on circuit configuration, device construction and materials.

To achieve the above objective, in this invention a selection circuit is connected between unit picture elements arranged in a matrix to form the display portion and a vertical scanning circuit, with which selection of odd or even lines in the display portion can be effected.

According to this invention, by providing a selection circuit, the necessity of interlaced scanning in the scanning circuit itself is eliminated, which makes it easy to effect interlaced scanning. In addition, the number of steps in the scanning circuit are cut in half when effecting interlaced scanning, which increases the margin in operating speed and eliminates the limitations on circuit configuration, device construction and materials. Furthermore, the above selection circuit can be incorporated on for example a Si circuit board with an image display device, etc. without especially increasing the number of processes, which in turn enables simplification of the drive circuit and decreases production costs. In addition, with this invention, both interlaced and non-interlaced scanning can be effected with the same device, and selection of either type of scanning is simple.

With this invention, scanning with the field selection signal must correspond to the odd or even field. When this is done, you must differentiate whether the field from one vertical synchronous signal to the next vertical synchronous signal is odd or even.

The other objective of this invention is to provide a differentiation circuit to distinguish between even and odd fields in dot matrix type image display devices, etc.

BRIEF DESCRIPTION OF THE DRAWINGS

A circuit diagram for a conventional image display device is shown in FIG. 1.

DETAILED DESCRIPTION OF THE PREFERRED EMBODIMENT

The embodiment of the invention in the FIGS. will now be used to explain this invention in detail.

Figure 1:
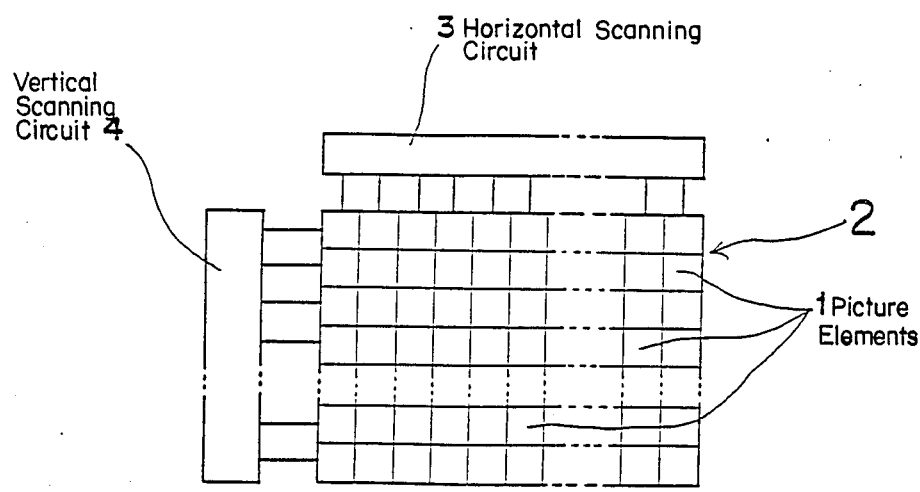
Figure 2:
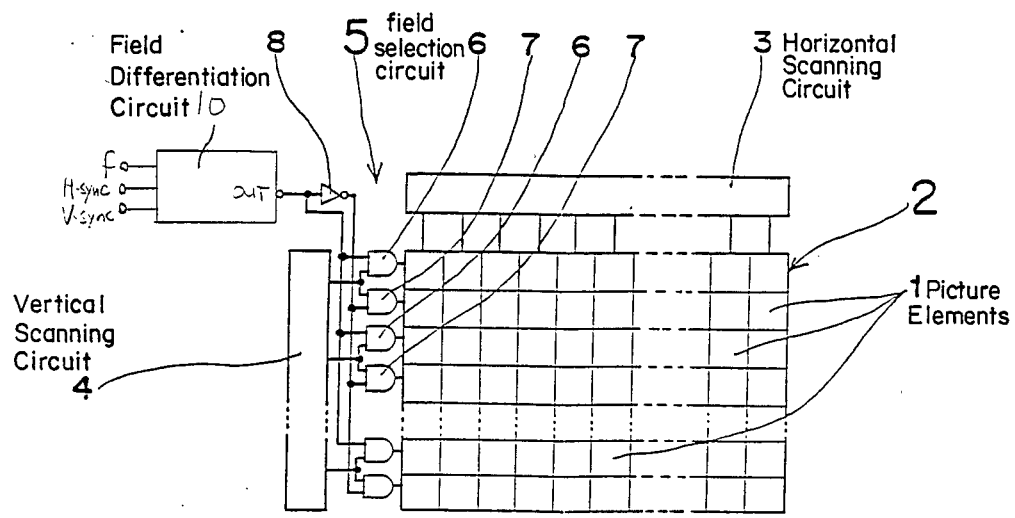
FIG. 2 illustrates one embodiment of the present invention.

In FIG. 2, (2) is the display portion which comprises unit image elements 1, 1, 1, . . . arranged in a matrix, (3) is the horizontal scanning circuit, (4) the vertical scanning circuit and (5) the field selection circuit.

The above field selection circuit (5) is provided with AND gates 6, 7, 6, 7, . . . and an inverter (8). The respective output terminals of the above AND gates 6, 6, . . . are connected to each odd line in the display portion (2), and the respective output terminals of the above AND gates 7, 7, . . . are connected to each even line in the display portion (2). Furthermore, one input terminal of each of the two AND gates 6, 7 which correspond to adjacent odd (2i−1) and even (2i) lines is connected to one of output terminals of the vertical scanning circuit (4). the field selection signal F is input to the other input terminal of the AND gate 6 which corresponds to the above odd line (2i−1), and the field selection signal F is input to the other input terminal of the AND gate 7 which corresponds to the above line (2i) through the inverter (8).

The drive circuit for the above configuration operates as follows.

(During odd field input)

The field selection signal F is assumed to be "1", the vertical scanning circuit (4) and horizontal scanning circuit (3) are operated. When this is done, the field selection signal "1" at the input terminal of the AND gates 7, 7, . . . which correspond to the even lines is inverted and a "0" level signal is input, the above AND gates 7, 7, . . . , are closed, prevention the picture elements 1, . . . in the even lines from operating. Since the field selection signal "1" is directly input to the AND gates 6, 6, . . . which correspond to the odd lines, the vertical scanning signal from the vertical scanning circuit (4) goes through the AND gates 6, 6, . . . and is input in the odd lines of the display portion (2), causing the odd lines to generate in sequence.

(During even field input)

The field selection signal F is assumed to be "0", and the vertical scanning circuit (4) and horizontal scanning circuit (3) are operated. When this is done, the field selection signal "0" is directly input to the input terminal of the AND gates 6, 6, ... which correspond to the odd lines which causes the above AND gates 6, 6, ..., to be closed and the picture elements 1, 1, ... in the odd lines do not operate. Also, the field selection signal "0" at the input terminal is inverted and a "1" level signal is input, to the input terminal of the AND gates 7, 7 ..., the vertical scanning signal from the above vertical scanning circuit (4) goes through the above AND gates 7, 7, ..., and is input to the even lines of the display portion (2) causing the the even lines to operate in sequence.

The above explained repeated input of a "1" or "0" field selection signal F alternately to the field selection circuit (5) enables simple interlaced scanning, eliminating the necessity of interlaced scanning in the vertical scanning circuit (4) itself, cutting the number of steps in the vertical scanning circuit (4) in half, in turn considerably increasing the margin in operating speed.

Figure 3:
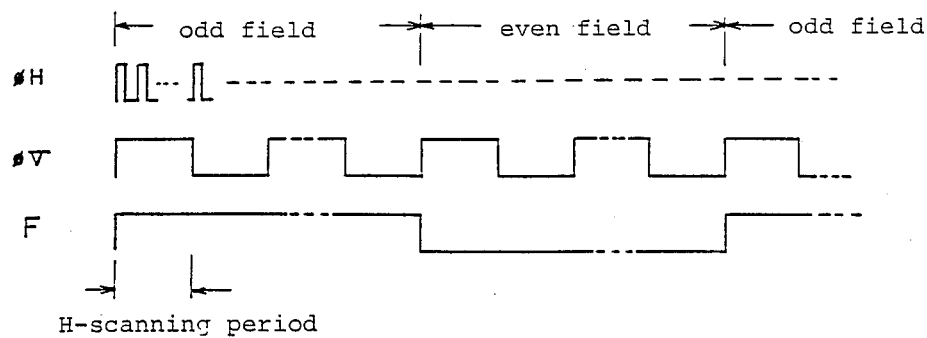
FIG. 3 illustrates a time chart for interlaced scanning.

The time chart for the above is shown in FIG. 3. In FIG. 3, φH is the horizontal scanning signal, φV the vertical scanning signal and F the field selection signal.

Furthermore, the above drive circuit is used to enable the following non-interlaced scanning.

Figure 4:
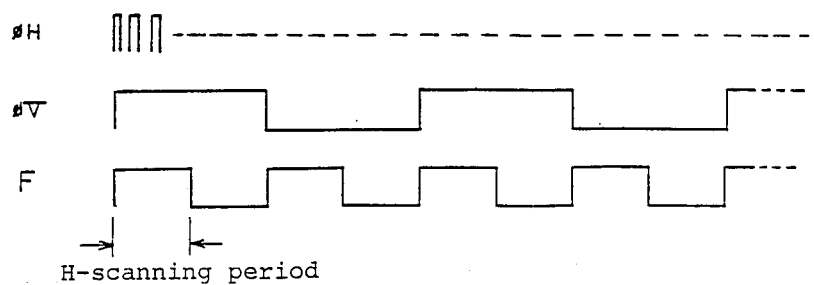
FIG. 4 a time chart for non-interlaced scanning.

Namely, when the field selection signal F is "1", the first line in the display portion is scanned, and when the field selection signal F is "0" the second line is scanned; when the field selection signal F becomes "1", the vertical scanning circuit (4) advances one stage to scan the third line. This operation is repeated in sequence to effect non-interlaced scanning of the following lines. A time chart for this operation is shown in FIG. 4.

The above selection circuit can of course be utilized in various configurations other than the above embodiment.

Figure 5:
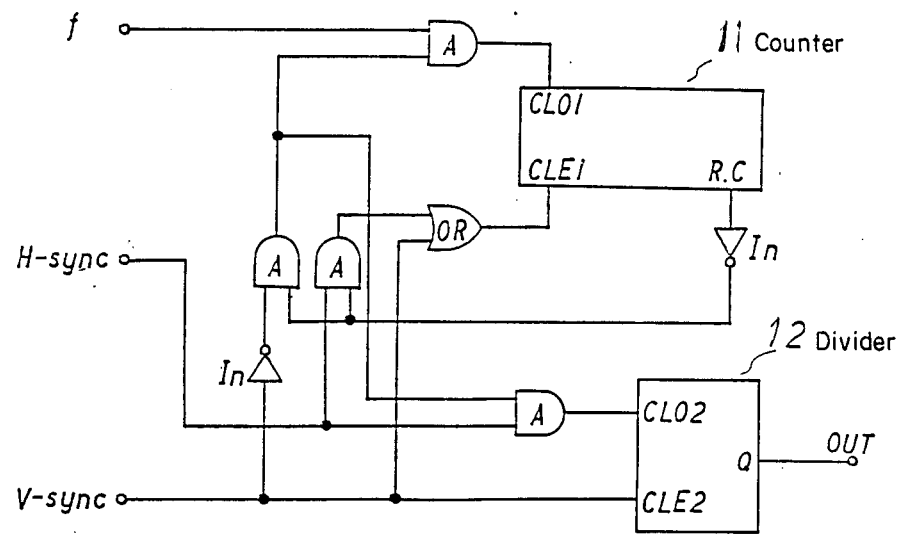
FIG. 5 illustrates a circuit diagram for a circuit to distinguish between odd and even fields.

The details of the odd/even field differentiation circuit (10) which generates the field selection signal are shown in FIGS. 5 and 6.

Figure 6A:
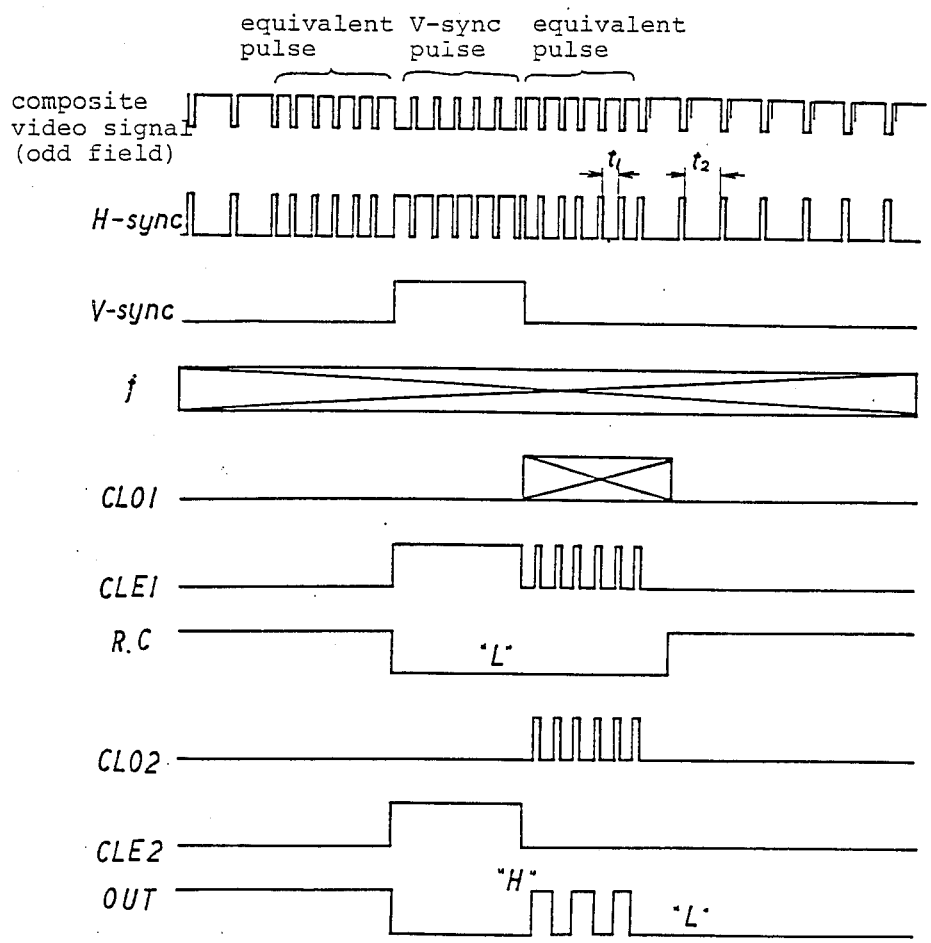
FIGS. 6(*a*) and (*b*) illustrates time charts showing sample signal waveforms for the odd and even fields in FIG. 5.
Figure 6B:
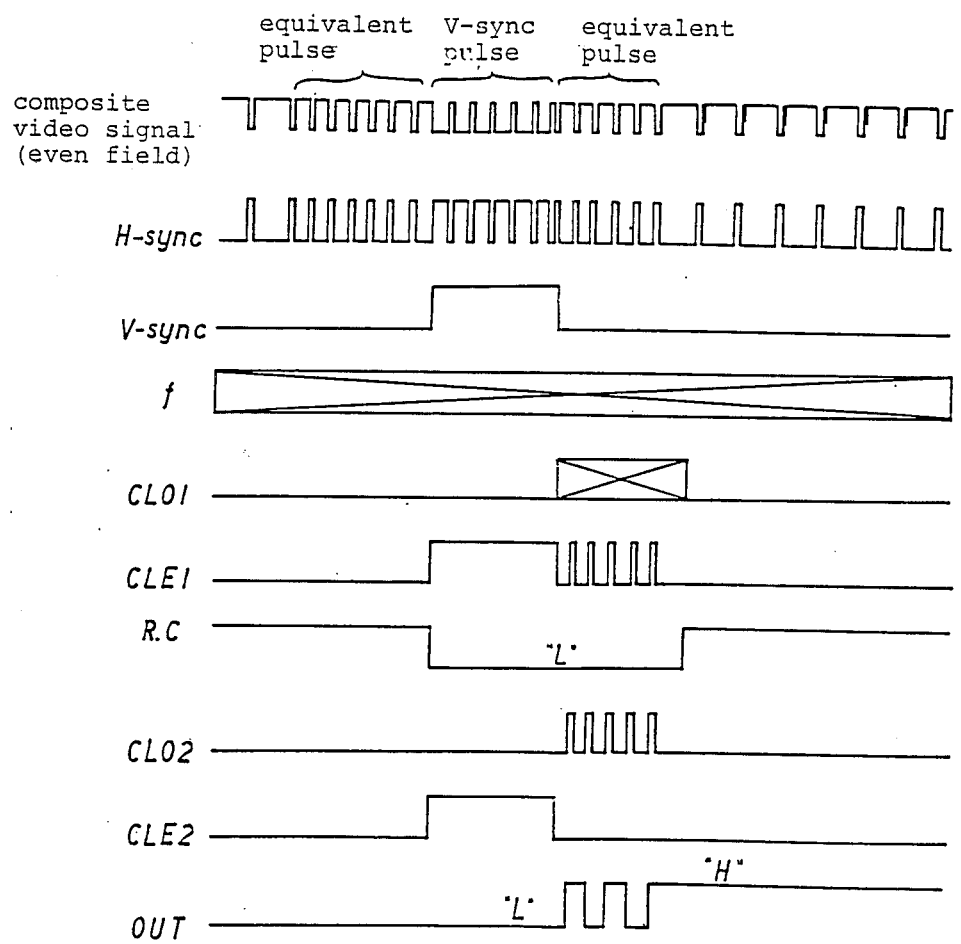

The circuit configuration of the field differentiation circuit is shown in FIG. 5 and the signal waveforms in the respective parts of FIG. 5 for odd and even fields are shown in FIGS. 6(a) and (b). A stands for AND gate, OR for OR gate and In for inverter. H-sync and V-sync are the horizontal synchronous signal and vertical synchronous signal which are obtained from the complex video signal. The vertical synchronous signal v-sync clears, or initializes the counter (11) and divider (12) (CLE 1 signal, CLE 2 signal "H"). When the period of the vertical synchronous signal V-sync ends, a clock pulse (f) which is much shorter than one half (t1) of one horizontal term (t2) is input as the CLO 1 signal of the counter (11), and is counted.

From when the counter (11) is cleared with the CLE 1 signal, the circuit is so composed that the R.C. (carry) signal is output for the said t1 or more (½ horizontal term) and for the said t2 or more (one horizontal term). On the other hand, the horizontal synchronous signal H-sync can be input as a CLE 1 signal. Accordingly, during the equalizing pulse portion from the back edge of the vertical synchronous signal V-sync, the horizontal synchronous signal H-sync (equivalent pulse) is input before the R.C. signal is output, and the counter (11) is cleared each time. In other words, during this time, the R.C. signal is not output, and it is held at "L".

However, when the equalizing pulse portion ends, the horizontal synchronous signal H-sync becomes t2 long, before which the R.C. signal ("H") is output. The R.C. signal inhibits the input of the clock pulse (f) and the horizontal synchronous signal H-sync, and the R.C. signal is held at the "H" condition.

The CLO 2 signal input as a horizontal synchronous signal H-sync (equalizing pulse) is divided by the divider (12) after the vertical synchronous signal V-sync ends. The divider (12) comprises a 1 bit counter, and each time an equivalent pulse is input, the condition is inverted and a Q signal is output. Here, when the horizontal synchronous signal H-sync (equivalent pulse) likewise inhibits input to the divider (12) when the R.C. signal ("H") is output from the counter, the final output signal OUT is "L" if the number of the equalizing pulses during this time are even, and "H" if the number of pulses is odd. This is held at this level until the next vertical synchronous signal V-sync is input (the counter (11) and divider (12) are cleared again), and the "L" or "H" level of this output signal OUT permits distinguishing of whether the field is odd or even.

In the odd field in FIG. 6(a), the even number of equalizing pulses (six) causes an "L" output signal (OUT). In the even field in FIG. 6(b), the odd number of equalizing pulses (five) causes an "H" output signal (OUT).

Furthermore, depending on the synchronous separation method, a portion of the equalizing pulse may be incorporated into the vertical synchronous signal. However, this simply enables the corresponding odd-/even equivalent pulses and odd/even fields to be reversed, with no fundamental change in the functioning of the circuit.

The field differentiation circuit (10) to which the clock pulse (f), horizontal synchronous signal H-sync and vertical synchronous signal V-sync are input, outputs an "L" output signal OUT when the field is odd, the AND gates 6, 6, ... come on and the odd lines only in the display portion (2) are selected in sequence. When the field is even, the output signal OUT is "H", the AND gates 7, 7, ... come on and the even lines only in the display portion (2) are selected in sequence.

In this embodiment, interlaced scanning in a dot matrix image display device can be effected, the necessity of interlaced scanning in the scanning circuit itself is eliminated, the number of steps in the scanning circuit for interlaced scanning is cut in half, the margin in operating speed is considerably increased, and limitations on circuit configuration and materials are eliminated.

What is claimed is:

1. An image panel display drive system, comprising:
   a display;
   horizontal driving means for scanning a plurality of horizontal fields of said display;
   vertical driving means for scanning a plurality of vertical fields of said display;
   differentiation means for producing a field selection signal; and
   selection means, connected to said vertical driving means for permitting said vertical driving means to selectively scan said display in an interlace or non-interlace mode in accordance with said field selection signal.

2. The drive system of claim 1, wherein said selection means is connected to said vertical driving means and to vertical input lines of said display.

3. The drive system of claim 1 wherein said selection means includes a plurality of selection output lines and said display has a plurality of vertical input lines wherein the number of said selection output lines equals the number of vertical input lines, and wherein said vertical driving means has a plurality of drive output lines, wherein a number of said drive output lines are connected to said selection means.

4. The drive system of claim 3 wherein each of said number of said drive output lines corresponds to two of said selection output lines.

5. The drive system of claim 1 wherein said display includes a dot matrix display.

6. The drive system of claim 1 wherein said plurality of vertical fields includes a plurality of odd fields and a plurality of even fields.

7. The drive system of claim 6 wherein said vertical driving means selectively alternately scans all of said odd fields and all of said even fields in said interlace mode and wherein said vertical driving means scans odd and even fields in said non-interlace mode.

8. An image panel display drive system, comprising:
a dot matrix display having a plurality of vertical input lines and a plurality of horizontal input lines;
horizontal driving means for scanning said plurality of horizontal input lines;
vertical driving means having a plurality of vertical drive lines for scanning a plurality of vertical fields, each of said vertical fields associated with one of said plurality of vertical input lines;
differentiation means for producing a field selected signal; and
selection means connected to said vertical driving means at said plurality of vertical drive lines for permitting said vertical driving means to selectively scan said display in an interlace or non-interlace mode in accordance with said field selection signal.

9. The drive system of claim 8 wherein said selection means includes a plurality of selection output lines equal in number to said plurality of vertical input lines that connect said selection to said display at said vertical input lines.

10. The drive system of claim 9 wherein each of said plurality of vertical drive lines corresponds to two of said selection output lines.

11. The drive system of claim 8 wherein said plurality of vertical fields includes a plurality of odd fields and a plurality of even fields.

12. The drive system of claim 11 wherein said vertical driving means selectively alternately scans all of said odd fields and all of said even fields in said interlace mode and wherein said vertical driving means scans odd and even fields in said non-interlace mode.

* * * * *